United States Patent
Genden et al.

(10) Patent No.: US 10,776,122 B2
(45) Date of Patent: Sep. 15, 2020

(54) PRIORITIZATION PROTOCOLS OF CONDITIONAL BRANCH INSTRUCTIONS

(71) Applicant: International Business Machines Corporation, Armonk, NY (US)

(72) Inventors: Michael J. Genden, Austin, TX (US); Eula Faye Abalos Tolentino, Austin, TX (US); Dung Q. Nguyen, Austin, TX (US); Jeffrey C. Brownscheidle, Seattle, WA (US); Tu-An T. Nguyen, Austin, TX (US); David S. Walder, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/008,583

(22) Filed: Jun. 14, 2018

(65) Prior Publication Data
US 2019/0384611 A1  Dec. 19, 2019

(51) Int. Cl.
*G06F 9/38* (2018.01)
*G06F 9/00* (2006.01)
(Continued)

(52) U.S. Cl.
CPC ........ *G06F 9/3844* (2013.01); *G06F 9/30058* (2013.01); *G06F 9/3804* (2013.01); *G06F 9/3855* (2013.01); *G06F 9/3861* (2013.01)

(58) Field of Classification Search
CPC .. G06F 9/3844; G06F 9/30058; G06F 9/3804; G06F 9/3855; G06F 9/3861
(Continued)

(56) References Cited

U.S. PATENT DOCUMENTS 6,766,441 B2   7/2004 Sinharoy
7,627,742 B2 * 12/2009 Bose ..................... G06F 1/3203
                                                                    712/205
(Continued)

OTHER PUBLICATIONS

Jacobsen et al., Assigning Confidence to Conditional Branch Predictions, Proceeding of the 29th Annual International Symposium on Microarchitecture, Dec. 2-4, 1996.
(Continued)

*Primary Examiner* — Chun Kuan Lee
(74) *Attorney, Agent, or Firm* — Lieberman & Brandsdorfer, LLC

(57) ABSTRACT

Embodiments relate to selection and execution of conditional branch instructions. A computer system is configured with a processing core, including an instruction fetch unit and an instruction sequence unit, operatively coupled to memory. The instruction fetch unit fetches instructions from instruction cache and searches the fetched instruction for any conditional branch instructions. For each conditional branch instruction, an associated confidence level assigned to the instruction is obtained. The instruction sequence unit dispatches conditional branch instructions with their confidence level to a branch issue queue (BRQ). In addition, the instruction sequence unit prioritizes the conditional branch instructions in the BRQ based on the assigned confidence level and age, and selects one of the conditional branch instructions. A branch execution unit is provided as part of the instruction fetch unit to execute the selected conditional branch instruction, followed by dynamically updated any related non-executed instructions in the BRQ.

15 Claims, 5 Drawing Sheets

(51) Int. Cl.
*G06F 9/44* (2018.01)
*G06F 9/30* (2018.01)

(58) Field of Classification Search
USPC .......................................................... 712/239
See application file for complete search history.

(56) References Cited

U.S. PATENT DOCUMENTS

| | | |
|---|---|---|
| 7,644,258 B2 | 1/2010 | Glew |
| 7,870,368 B2 | 1/2011 | Luick |
| 7,979,725 B2* | 7/2011 | Atkinson .............. G06F 1/3225 |
| | | 712/239 |
| 8,006,070 B2 | 8/2011 | Gschwind et al. |
| 8,255,669 B2 | 8/2012 | Gschwind et al. |
| 9,348,599 B2 | 5/2016 | Busaba et al. |
| 9,389,868 B2 | 7/2016 | Gschwind |
| 9,519,485 B2 | 12/2016 | Busaba et al. |
| 2007/0061554 A1 | 3/2007 | Worrell |
| 2014/0201507 A1* | 7/2014 | Jayaseelan ............ G06F 9/3844 |
| | | 712/239 |
| 2017/0004129 A1 | 1/2017 | Shalaby et al. |

OTHER PUBLICATIONS

Malik et al., PaCo: Probability-based Path Confidence Prediction, International Symposium High Performance Computer Architecture (HPCA-14):999-999, 2008.
Jimenez, Composite Confidence Estimator for Enhanced Speculation Control, 21st International Symposium on Computer Architecture and High Performance Computing, 2009.

* cited by examiner

PRIORITIZATION PROTOCOLS OF CONDITIONAL BRANCH INSTRUCTIONS

BACKGROUND

The present embodiments related to the field of processor design. More specifically, the present embodiments relate conditional branch instructions and processing of the conditional branch instructions.

A processor in a computer system may process an instruction by executing the instruction in a series of steps, or operations. In some cases, to increase the number of instructions being processed by the processor, and therefore increase the speed of the processor, the processor may be pipelined. Pipelining refers to providing separate stages in a processor, wherein each stage performs one or more steps necessary to execute an instruction. As an example of execution instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Accordingly, the processor may process two or more instructions at the same time in parallel.

A computer program may include branch instructions, which cause the computer program to branch from one instruction to a target instruction, thereby skipping sequential instructions, if any, if a condition defined by the branch instruction is satisfied. If the condition is not satisfied, the next instruction sequentially after the branch instruction may be executed without branching to the target instruction. Typically, the outcome of the condition being tested is not known until the branch instruction is executed and its condition is tested. Accordingly, the correct next instruction to be executed after the branch instruction may not be known until the condition is tested.

Where a pipeline is utilized to execute instructions, the outcome of the branch instruction may be unknown until branch resolution. The correct next instruction to be executed after the branch instruction may not be known until the branch instruction has passed through one or more stages necessary to determine the outcome of the condition. In some cases, execution of instructions in the pipeline may be stalled, e.g. the stages of the pipeline preceding the branch instruction may not be used to execute instructions, until branch resolution. When the pipeline is stalled, the pipeline is not being used to execute as many instructions in parallel, decreasing overall processor efficiency.

Branch prediction predicts which way a branch will evaluate before fetching, loading, and executing further instructions based on the prediction. To improve processor efficiency, branch prediction may be used to predict the outcome of branch instructions. For example, when a branch instruction is encountered, the processor may predict which instruction, or path, will be executed after the outcome of the condition is known. Then, instead of stalling a pipeline when the branch instruction is issued, the processor may continue issuing instructions beginning with the predicted next instruction. If the branch prediction is correct, then the pipeline would already be loaded with the instructions following the branch, allowing for a faster information flow through the pipeline. However, if the branch prediction is incorrect, then all of the information that was loaded based on the branch prediction must be flushed, causing a significant drop in performance.

SUMMARY

The embodiments include a system, computer program product, and method for natural language processing directed at operation of a route navigation tool.

In one aspect, a computer system is provided with a processing core operatively coupled to memory. The processing core includes an instruction fetch unit (IFU) and an instruction sequence unit (ISU). The IFU functions to fetch instructions from instruction cache, and to scan the fetched instructions for conditional branch instructions. In addition, the IFU obtains a branch confidence level assignment for each fetched conditional branch instruction. The ISU functions to dispatch the conditional branch instructions with the obtained confidence level to a branch issue queue (BRQ). In addition, the ISU prioritizes and select a conditional branch instruction in the BRQ based on both the assigned confidence level and age and based on the instruction being ready for execution. Once selected, a branch execution unit executes the selected conditional branch instruction.

In another aspect, a computer program product is provided for selection and execution of conditional branch instructions. The computer program product comprises a computer readable storage device having program code embodied therewith. The program code is executable by a processing unit to fetch instructions from instruction cache, and scan the fetched instructions for conditional branch instructions. In addition, the program code obtains a branch confidence level assignment for each fetched conditional branch instruction, and dispatches the conditional branch instructions with the obtained confidence level to a branch issue queue (BRQ). The conditional branch instructions in the BRQ are prioritized based on the assigned confidence level and age, and based on the instruction being ready to execute. The prioritization includes selection of one of the conditional branch instructions. Once selected, the conditional branch instruction is executed.

In yet another aspect, a method is provided for selection and execution of conditional branch instructions. Instructions are fetched from instruction cache and scanned for conditional branch instructions. A branch confidence level assignment is obtained for each fetch conditional branch instruction. The conditional branch instructions are dispatched with the obtained confidence level to a branch issue queue (BRQ) where they are prioritized. Specifically, the conditional branch instructions in the BRQ are prioritized based on the assigned confidence level and age, and the prioritization including that the instruction is ready for execution. One of the conditional branch instructions is selected and executed.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
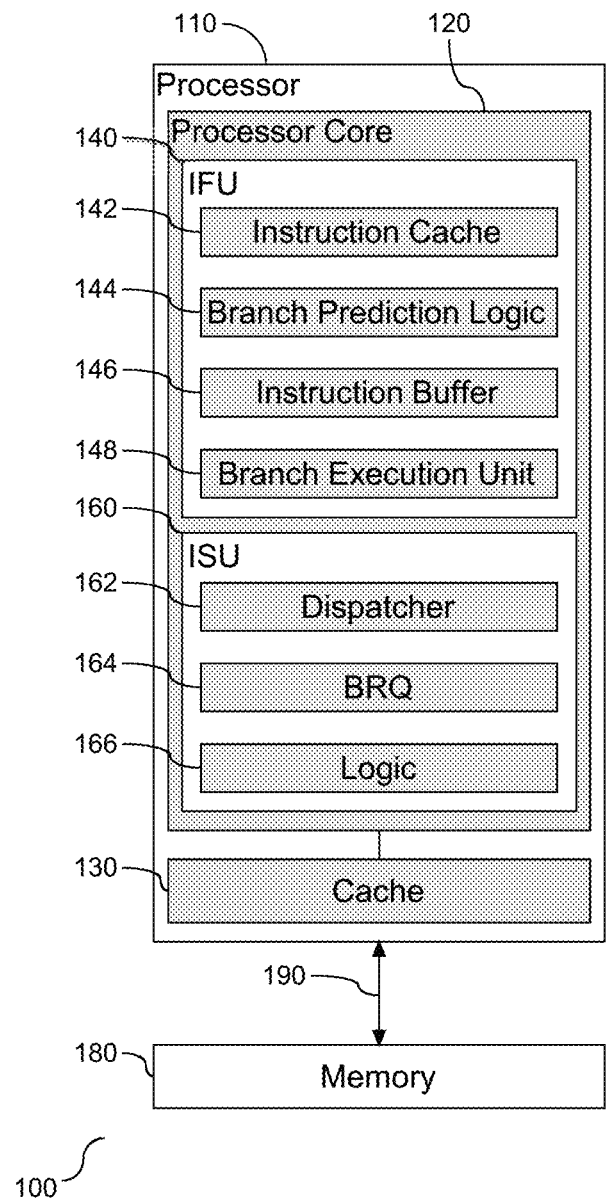
FIG. 1 depicts a block diagram illustrating a system diagram of selected components of a microprocessor system.

It will be readily understood that the components of the present embodiments, as generally described and illustrated in the Figures herein, may be arranged and designed in a wide variety of different configurations. Thus, the following detailed description of the embodiments of the apparatus, system, and method, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

The description that follows includes exemplary systems, methods, techniques, instruction sequences and computer program products that embody techniques of the present inventive subject matter. However, it is understood that the described embodiments may be practiced without these specific details. For instance, although examples refer to individual process components, these may not be distinct components in some implementations. Additionally, examples refer to definitions of instructions. Although they may be derived from actual implementations, they have been simplified to facilitate the description of the art, and actual implementation may vary. In other instances, well-known instruction instances, protocols, structures, and techniques have not been shown in detail in order not to obfuscate the description.

A processor operates on instructions in a linear fashion. The processor loads instructions from memory into cache memory, such as an instruction cache. Within the processor, individual instructions go through several stages called the pipeline. These stage includes, but are not limited to, instruction fetch, instruction decode, and execution.

One goal of a pipelined processor is to have an instruction in each stage of the pipeline at a time. Although this functions well for a purely linear program, most programs have branch instructions. Branch instructions allow a program to jump to a different point in the program instead of running linearly. Conditional branch instructions allow a program to branch based on a specific condition, such as the value of a register. If the branch condition is true, one branch is taken, and if the branch condition is false, a different branch is taken. Conditional branch instructions create a problem with a pipelined processor because the processor has not typically calculated the value of the branch condition until it is executed. The execution is usually towards the end of the pipeline, and as such, the processor does not know which instruction will come after the branch instruction. The processor delays adding instructions into the pipeline until the branch condition has been calculated, and the next instruction is determined. The delay causes inefficiencies by each branch instruction. Although both conditional and non-conditional branches exist, the current discussion is concerned with conditional branches. Accordingly, the term "branch" will refer to a conditional branch hereinafter.

Branch prediction is a technique that helps reduce inefficiency. Branch prediction allows the processor to guess which branch will be taken, which in one embodiment may be based on a history of that particular branch. A branch instruction may be predicted with a high confidence or a low confidence. The level of confidence may be determined based on a condition threshold defined in the processor. Counters may be employed to track selection of branch instructions in a branch history table in order to facilitate distribution of issuance of both low and high level branch instructions.

In addition to branch prediction, a branch prediction algorithm may be implemented to assign a value to a branch prediction. Examples of such values include, but are not limited to, strongly taken, weakly taken, strongly not taken, and weakly not taken. These values indicate a level of confidence the prediction algorithm has in an associated branch prediction. For example, a weakly predicted value is less likely to be correct than a strongly predicted branch, and the weakly predicted branch may be prone to cause flushing and performance loss.

Referring to FIG. 1, a conceptual system diagram (100) is provided to depict selected components of a microprocessor system to prioritize and select branch instructions based on a branch prediction confidence level. FIG. 1 depicts an example computer system with a processor core that accommodates incorporate confidence level with selected processing of branch instructions. As shown, the computer system includes a processor (110), which in one embodiment may include multiple processors, multiple cores, and/or implement multi-threading, etc. The processor (110) is shown operatively coupled to memory (180) across a bus (190). The processor (110) is shown with at least one processor core (120) operatively coupled to cache (130). The processor core (120) is shown with an instruction fetch unit (IFU) (140) operatively coupled to an instruction sequence unit (ISU) (160). The instruction fetch unit (140) is shown with instruction cache (142), branch prediction logic (144), an instruction buffer (146), and a branch execution unit (148). The instruction sequence unit (ISU) (160) is shown with a dispatcher (162), a branch issue queue (BRQ) (164), and logic (166).

The instruction cache (142) is a form of cache memory reserved for instructions. The IFU (140) fetches instructions from the instruction cache (142). In one embodiment, in a single cycle, the IFU (140) fetches 8 instructions from the instruction cache (142). The IFU (140) scans the fetched instructions to identify presence of any branch instructions. Any identified branch instructions are sent by the IFU (140) to the branch prediction logic (144), which functions to determine a new fetching direction after the branch. More specifically, the branch prediction logic (144) obtains a branch confidence level assigned to the identified branch instruction(s). In one embodiment, the logic (144) consults a branch history table (not shown) to identify or obtain the confidence level. The instruction(s) fetches from the instruction cache (142) are forwarded to the instruction buffer (146). In addition, the branch confidence level for the identified branch instruction(s) are sent to the instruction buffer (146) and aligned with the identified branch instructions. The confidence level is associated with a bit. For example, in one embodiment, the confidence bit may be set to 1 for a high confidence level and set to 0 for a low confidence level, or in one embodiment, the assignment may be inverted. Accordingly, conditional branch instructions are identified in the instruction cache (142) and sent to the instruction buffer (146) with the branch prediction logic (144) to assign and associate a confidence level (144) bit with each conditional branch instruction in the buffer (146).

As shown, the ISU (160) is operatively coupled to the IFU (140). The dispatcher (162) functions as a conduit between the instruction buffer (146) and the BRQ (164). More specifically, the dispatcher (162) conveys the branch instructions populated in the instruction buffer (146) to the BRQ (164). As the conditional branch instructions are populated in the BRQ, the confidence level bit assigned to the branch instruction is written into the BRQ along with the branch instruction entry. Logic (166) in the ISU (160) is utilized to identify and select branch instructions for execution. More specifically, the logic (166) prioritizes the identified and selected branch instructions. The prioritization is based on the associated confidence level bit, and in one embodiment incorporates age. As the conditional branch instructions are prioritized, they are dispatched from the BRQ (164) to the branch execution unit (148) in the IFU (140). In one embodiment, if the branch instruction is ready to be issued, i.e. all of the operands are available and the confidence level bit is set to 0, the logic (166) will gate off the ready bits of all other branch instructions with a confidence level bit of 1. This effectively excludes high confidence branch instructions from the selection process. In addition, the confidence level bit, there is an issue valid bit associated with the instruction and populated into the BRQ (164). The instruction bit reflects whether the conditional branch instruction is available to issue. In one embodiment, a bit value of 1 indicates that the instruction is available to issue and a bit value of 0 indicates that the instruction is not available to issue. Accordingly, selection of a conditional branch instruction by the logic (166) entails evaluation of both the confidence level bit and the instruction available bit.

Once the logic (166) has identified available and ready branch instructions in the BRQ (164), the logic (166) will mask off all branch instructions in the BRQ (164) identified as high confidence. Accordingly, following the masking, the only branch instructions that can be selected for issue are low confidence level branch instructions that are available to issue.

The logic (166) identifies and selects one or more branch instructions for issuance from the BRQ (164) to the branch execution unit (148). In one embodiment, the logic (166) employs an age factor from the available branches, and selects the oldest and available to issue low confidence instruction to issue out of the BRQ (164). Similarly, in one embodiment, the logic (166) employs a counter or similar tool to track selection of branch instructions from the BRQ (164) for execution. The counter tracks sequential selection of low confidence branch instructions, and in select circumstances modifies the order of the branch instruction selection to prioritize branch instruction selection based on age, e.g. the oldest branch instruction in the BRQ, thereby prevent selection and execution of too many sequential issuance and execution of low confidence level branch instructions. Accordingly, the order of branch instruction selection from the BRQ (164) may be modified to prevent starvation of older branch instructions with a high confidence level designation.

When a branch instruction is executed and completed, the resolution is known. Following execution of the issued branch instruction, the branch execution unit (148) compares the predicted branch confidence level, e.g. predicted value, to the actual value. In one embodiment, the branch execution unit (148) compares a bit in the condition register with a prediction bit in the branch history table. The branch execution unit (148) dynamically updates the confidence level of any non-executed younger branch instructions in the BRQ (164) to reflect branch direction. This update takes place in real-time. In one embodiment, logic (166) is referred to herein as update logic as it functions as an interface between the branch execution unit (148) and BRQ (164) to selectively update the confidence level of branch instructions populated in the BRQ (164). If the executed branch instruction was assigned a low confidence level and the branch is resolved correctly, younger non-executed branch instructions in the same execution path and populated in the BRQ (164) are updated by the logic (166) with a high confidence level classification. Similarly, if the executed branch instruction was assigned a high confidence level and the branch is resolved correctly, the confidence level or any younger non-executed branch instructions in the same execution path and populated in the BRQ (164) are maintained by the update logic (166). However, if the executed branch instruction is not successfully resolved, younger branch instructions in the same execution path are identified and flushed out of the BRQ (164) by the update logic (166). Accordingly, the update logic (166) functions to update the confidence level of non-executed branch instructions present in the BRQ and in the same execution path to reflect branch direction.

Figure 2:
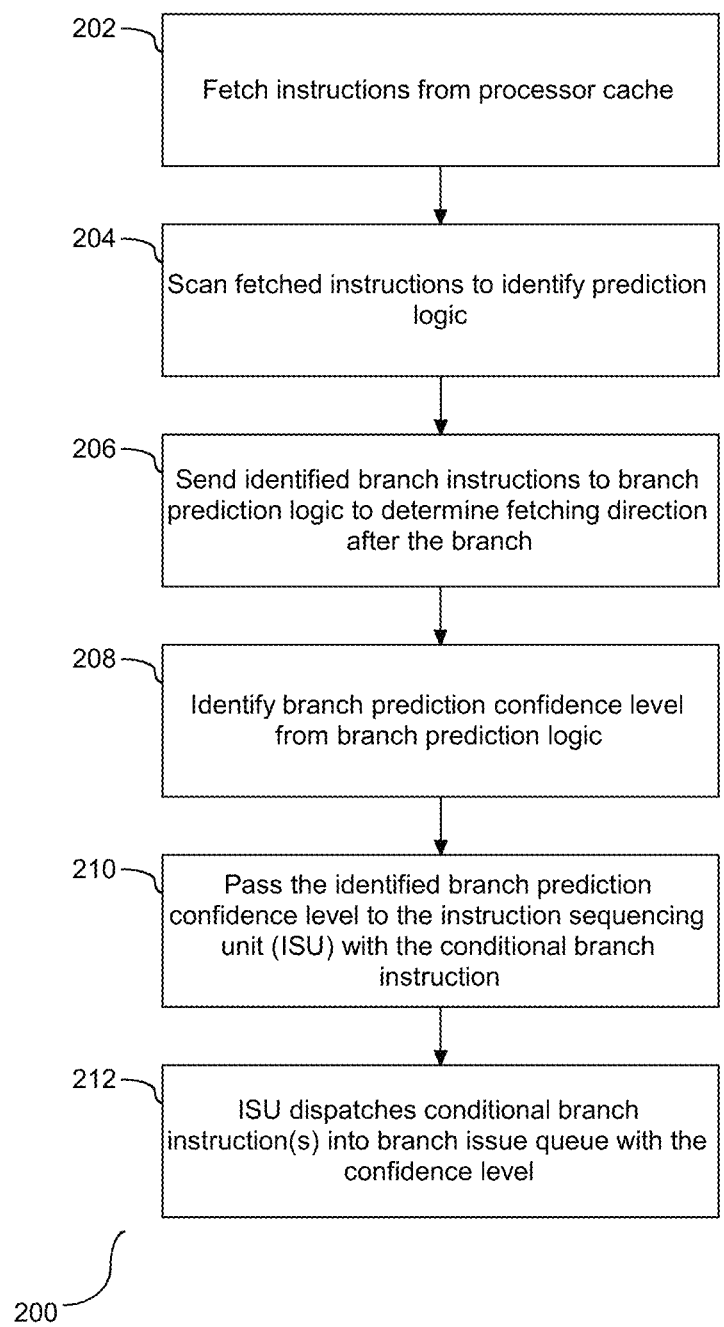
FIG. 2 depicts a flow chart illustrating a flow chart depicting a process for dispatching branch instructions into the branch issue queue (BRQ).

Referring to FIG. 2, a flow chart (200) is provided depicting a process for dispatching branch instructions into the branch issue queue (BRQ). As shown, on a processor cycle basis, instructions are fetched from the processor cache (202). The fetched instructions are scanned to identify branch instructions, if any, (204). The identified branch instructions are sent to the branch prediction logic (206) to determine a new fetching direction after the branch. Thereafter, the branch prediction confidence level of the branch instructions is identified from the branch prediction logic (208). In one embodiment, the confidence level may be one of strongly taken, taken, weakly taken, strongly not-taken, not-taken, and weakly not-taken. The identified branch prediction confidence level is passed on to the instruction sequencing unit (ISU) along with the branch instruction (210). The ISU dispatches the branch instruction(s) into the BRQ along with the confidence level (212), e.g. confidence level bit(s). As shown and described in FIGS. 3 and 4, the confidence level bits are used in conjunction with age detection logic to prioritize selection and execution of the branch instructions in the BRQ. Accordingly, as shown, branch instructions and their associated predicted confidence level are identified and dispatched into the BRQ for processing.

One or more branch prediction algorithms function to assign a value to a branch prediction. These values indicate the level of confidence the algorithm has in the prediction. It is understood that weakly predicted branches are less likely to be correct in comparison to strongly predicted branches. In other words, weakly predicted branches are more prone to cause flushing and performance loss. As shown and described in FIGS. 3 and 4, branches with a weak, or in one embodiment weaker, predicted confidence level are assigned a higher priority in the BRQ in comparison to branches with a strong, or in one embodiment stronger, predicted confidence level. It is understood that elevating weak or weaker branch instructions in the BRQ enhances processor performance by efficiently executing and evaluating mis-predicted branch instructions. Accordingly, an associated branch mis-prediction penalty is minimized by utilizing the branch confidence level as shown and described.

Figure 3:
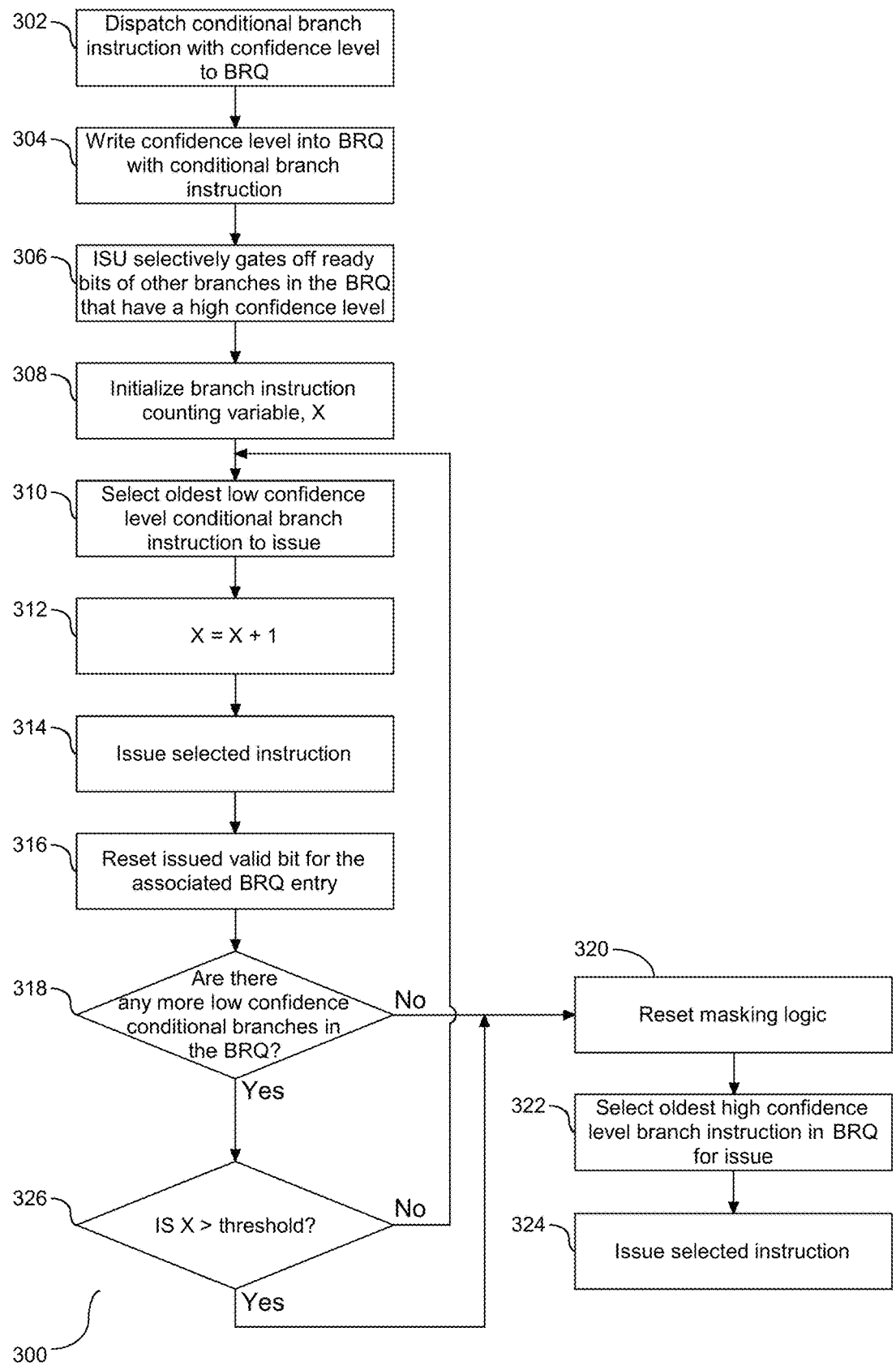
FIG. 3 depicts a flow chart illustrating dispatch and execution of branch instructions.

Referring to FIG. 3, a flow chart (300) is provided illustrating dispatch and execution of branch instructions. As shown, branch instructions together with their associated confidence level, e.g. confidence bit, are dispatched to the BRQ (302). The branch confidence level is written into the BRQ along with the branch instruction (304). At such time as the branch instruction is ready to issue and the associated confidence level is determined to be low, as identified by the confidence level bit, the instruction sequence unit gates off the ready bits of the other branch instructions in the BRQ that have a high confidence level (306). In one embodiment, the branch instruction is determined to be ready to issue when all operands are available and the issue valid bit is set to 1. Accordingly, at such time as the gating takes place at step (306), the high confidence value branches are excluded from the selection process.

As demonstrated in detail below, a counter may be integrated into the branch instruction dispatch process. A branch instruction counting variable, X, is initialized (308). The counter functions to balance selection of low and high priority branches from the BRQ for execution. The BRQ selects the oldest low confidence branch instruction to issue out first (310). Following the selection, the branch instruction counting variable is incremented (312). The selected instruction is issued (314) and its issue valid bit is reset, e.g. bit reset to 0, for that queue entry (316). It is then determined if there are any more low confidence conditional branch instructions present in the BRQ (318). In one embodiment, the determination at step (318) searches for the next oldest low confidence branch instruction to issue in the following cycle. A negative response to the determination at step (318) is followed by resetting the masking logic (320), selection of the oldest high confidence branch in instruction in the BRQ for issue (322), and issuance of the selected instruction (324). Accordingly, without consideration for a starvation factor, the process selects low confidence branch instructions for issue in age order, e.g. oldest to youngest.

It is understood that the BRQ may contain a selection of low and high confidence branch instructions. Based on the process flow shown herein, a positive response to the determination at step (318) is an indication that there are at least two low confidence branch instructions present in the queue. Before processing the next branch instruction classified as low confidence, it is determined if the counting variable, X, exceeds a defined threshold (326). The threshold and associated evaluation prevents starvation of high confidence level conditional branch instructions from issuance. More specifically, the threshold and associated evaluation prevents or mitigates sequential issuance of too many low confidence level conditional branch instructions. A positive response to the determination at step (326) is followed by a return to steps (320)-(324) for selection and issuance of the oldest high level confidence conditional branch instruction in the BRQ. However, a negative response to the determination at step (322) is followed by a return to (310) for selection of the next oldest low confidence branch instruction to issue. Accordingly, as demonstrated limited selection of low confidence level conditional branch instructions are prioritized for issuance with consideration to age order.

When a branch instruction is executed, resolution of the instruction is known. It is further understood that other instances of the branch instruction may be present in the BRQ following execution of the branch instruction. More specifically, there may be multiple branches in the same path. If an older branch was assigned a low confidence level, then a younger branch in the same path would also be assigned a low confidence level. However, if the older branch in the same path was resolved corrected, then the confidence level of the younger branch in the same path would now have a higher confidence level that it would also be resolved correctly. Conversely, if an older branch was assigned a high confidence level, then the younger branch on the same path would also be assigned the high confidence level. However, if the older branch was resolved incorrectly, then the younger branch on the same path would be assigned a lower confidence level that it would be resolved correctly. In one embodiment, a dynamic update mechanism may be employed with an implied relationship identifier, such as a subset, e.g. 5 bits, of the branch's address bits along with the confidence level. The implied relationship identifier could identify other instances of the same branch instruction. With this embodiment, when a branch is executed, the executed branch's address bits are compared to the address bits stored in each BRQ entry, and the confidence level is only updated if those address bits match.

Figure 4:
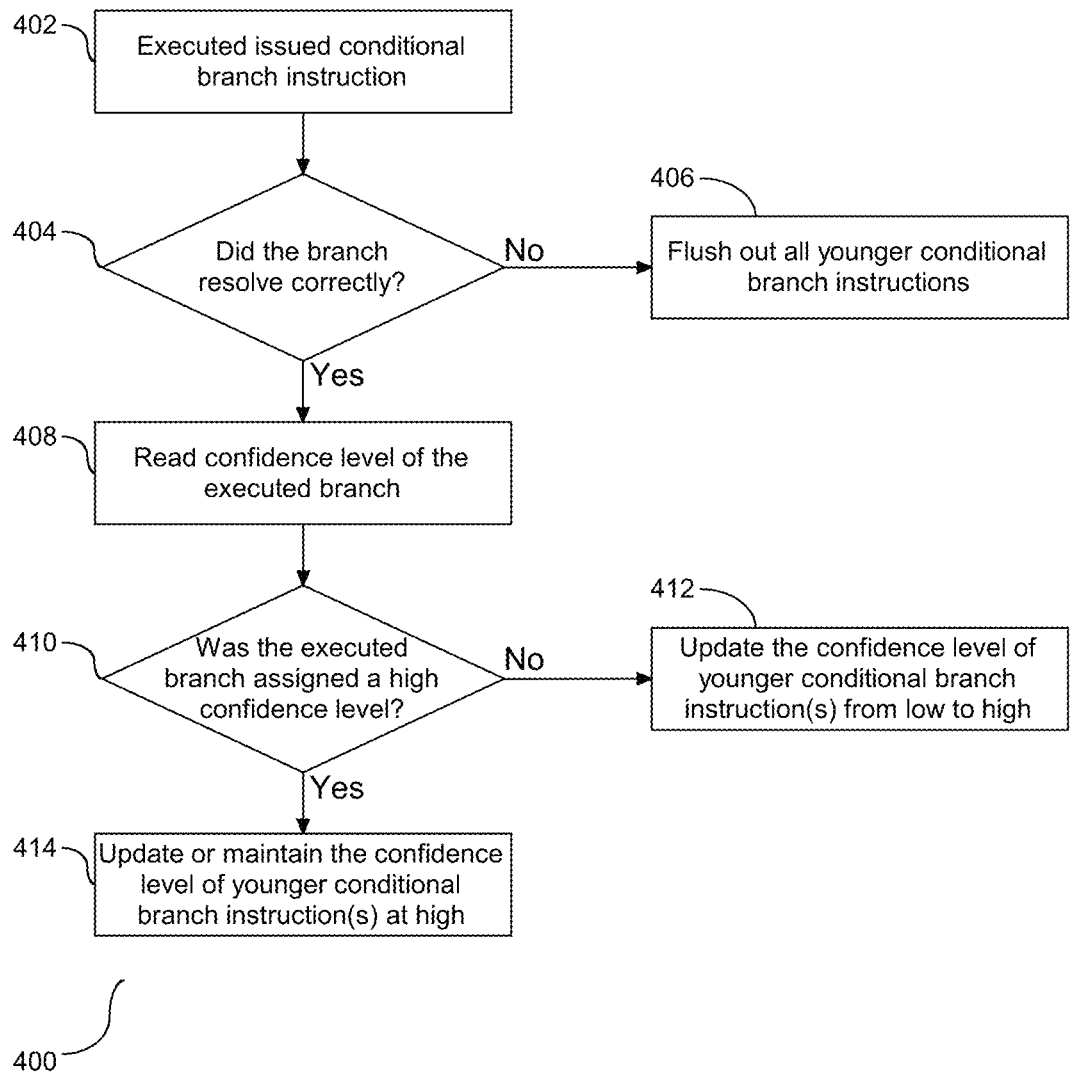
FIG. 4 depicts a flow chart illustrating a process for dynamically updating pending branch instruction entries in the BRQ.

Referring to FIG. 4, a flow chart (400) is provided illustrating a process for dynamically updating pending branch instruction entries in the BRQ. As shown, the issued conditional branch instruction is executed (402), and it is determined if the branch resolved correctly (404). It is understood in the art that multiple branches may be present in the same path. In one embodiment, the branch execution unit compares the branch prediction to the branch resolution. Similarly, in one embodiment, the branch execution unit compares a bit in the condition register with a prediction bit in the branch history table. A negative response to the determination at step (404) is followed by flushing out all younger conditional branch instructions in the BRQ (406). If the finished older branch is resolved incorrectly, then a younger branch will get flushed out regardless of the assigned confidence level. However, a positive response to the determination at step (404) is followed by reading the confidence level of the executed branch (408). It is then determined if the executed branch was assigned a high confidence level (410). A negative response is followed by updating the confidence level of younger conditional branch instructions from low to high (412), and a positive response is followed by updating or maintaining the confidence level of younger conditional branch instruction at high (414). In one embodiment, the condition evaluation at steps (410)-(414) may be inverted. As shown and described, the confidence level of other conditional branches instructions that are present in the BRQ are dynamically updated following execution of conditional branch instruction.

The system described above in FIG. 1 has been labeled with tools, including but not limited to, the ISU (160), IFU (140), and various modules, logic, and associated units. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Figure 5:
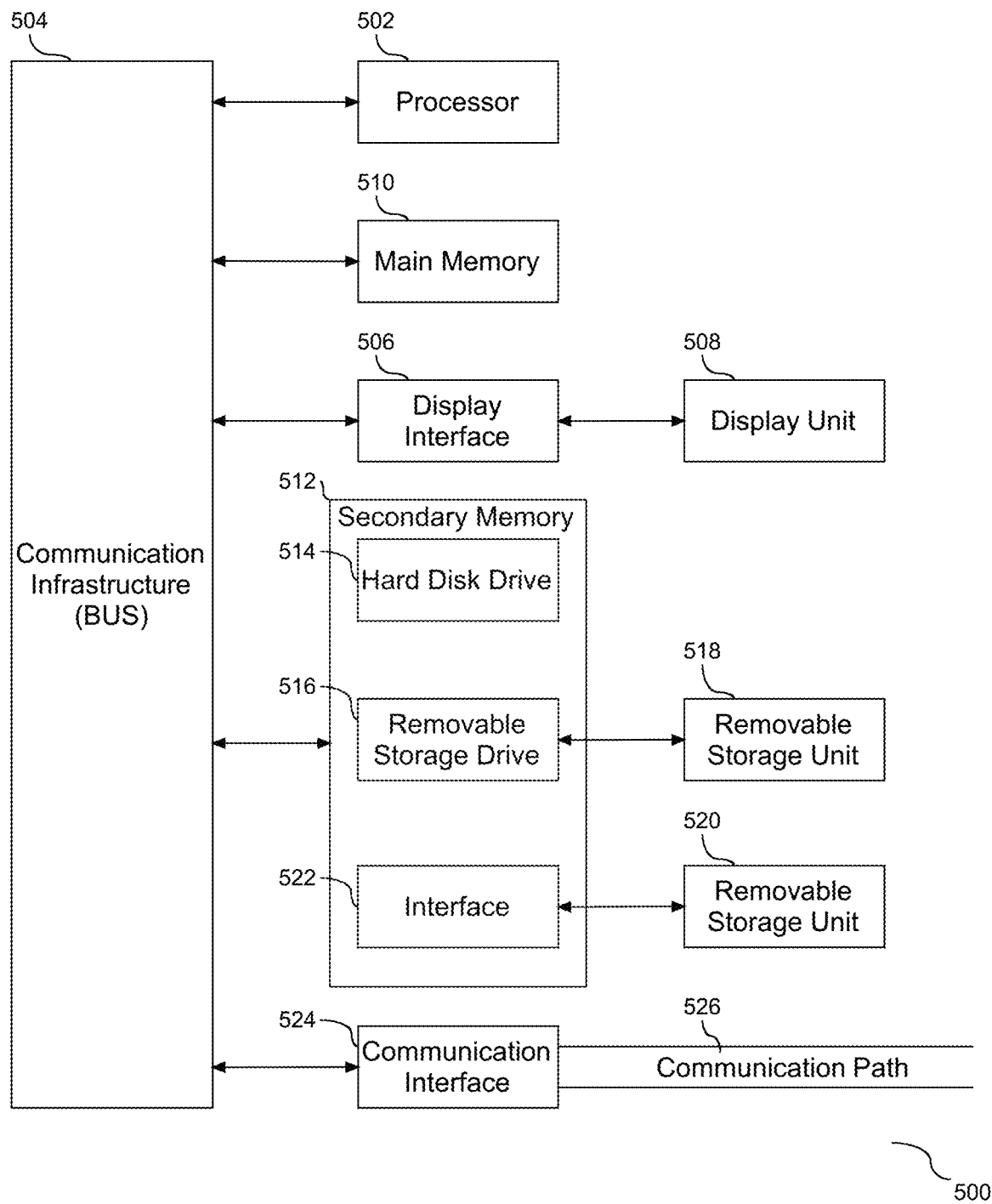
FIG. 5 depicts block diagram showing a system for implementing the tools of FIG. 1.

Referring now to the block diagram of FIG. 5, additional details are now described with respect to implementing an embodiment of the present embodiments. The computer system (500) includes one or more processors, such as a processor (502). The processor unit (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516).

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) is in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present embodiments as discussed herein. In particular, the computer programs, when run, enable the processor (502) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Accordingly, the implementation of conditional branch instruction selection and dispatch incorporating confidence and age levels effectively minimizes any associated branch mis-prediction penalty.

It will be appreciated that, although specific embodiments have been described herein for purposes of illustration, various modifications may be made without departing from the spirit and scope of the embodiments. In particular, more complexity (i.e., additional bits) may be employed in the branch confidence level. In another embodiment, an alternative issue queue may be implemented in which relative ages of the instructions are not exactly known by the issue selection logic. Accordingly, the scope of protection of these embodiments is limited only by the following claims and their equivalents.

What is claimed is:

1. A computer system comprising:
a processing core operatively coupled to memory, the processing core including an instruction fetch unit and an instruction sequence unit;
the instruction fetch unit to:
fetch instructions from instruction cache, and scan the fetched instructions for conditional branch instructions; and
obtain a branch confidence level assignment for each fetch conditional branch instruction;
the instruction sequence unit to:
dispatch the conditional branch instructions with the obtained confidence level to a branch issue queue (BRQ); and
prioritize the conditional branch instructions in the BRQ based on the assigned confidence level and age, including selection of one of the conditional branch instructions that is ready to execute;
a branch execution unit to execute the selected conditional branch instruction; and
the instruction sequence unit to dynamically update the confidence level of a non-executed branch instruction populated in the BRQ and related to the executed instruction, the update to reflect prediction confidence.

2. The system of claim 1, further comprising the instruction sequence unit to:
identify a younger branch instruction in the BRQ having a same execution path as the executed branch instruction; and
update the branch confidence level of the younger branch instruction from a low confidence level to a high confidence level after successful resolution of the executed branch instruction.

3. The system of claim 1, further comprising the instruction sequence unit to:
identify a younger branch instruction in the BRQ having a same execution path as the executed branch instruction; and
maintain the branch confidence level of the younger branch instruction in the BRQ at a high confidence level following successful resolution of the executed branch instruction.

4. The system of claim 1, further comprising the instruction sequence unit to:
flush out a younger branch instruction from the BRQ after an unsuccessful resolution of the executed branch instruction.

5. The system of claim 1, further comprising a counter operatively coupled to the instruction sequence unit, the counter to:
track selection of a low confidence level branch instruction, including re-assign a priority to an oldest branch instruction in the BRQ after a threshold of low confidence conditional branch instructions have been selected for execution.

6. A computer program product for selection and execution of conditional branch instructions, the computer program product comprising a computer readable storage device having program code embodied therewith, the program code executable by a processing unit to:
fetch instructions from instruction cache, and scan the fetched instructions for conditional branch instructions;
obtain a branch confidence level assignment for each fetch conditional branch instruction;
dispatch the conditional branch instructions with the obtained confidence level to a branch issue queue (BRQ);
prioritize the conditional branch instructions in the BRQ based on the assigned confidence level and age, including selection of one of the conditional branch instructions that is ready to execute;
execute the selected conditional branch instruction; and
dynamically update the confidence level of a non-executed branch instruction populated in the BRQ, the update to reflect prediction confidence.

7. The computer program product of claim 6, further comprising program code to:
identify a younger branch instruction in the BRQ having a same execution path as the executed branch instruction; and
update the branch confidence level of the younger branch instruction from a low confidence level to a high confidence level after successful resolution of the executed branch instruction.

8. The computer program product of claim 6, further comprising program code to:
identify a younger branch instruction in the BRQ having a same execution path as the executed branch instruction; and
maintain the branch confidence level of the younger branch instruction in the BRQ at a high confidence level following successful resolution of the executed branch instruction.

9. The computer program product of claim 6, further comprising program code to:
flush out a younger branch instruction from the BRQ after an unsuccessful resolution of the executed branch instruction.

10. The computer program product of claim 6, further comprising program code to:
track selection of a low confidence level branch instruction, including re-assign a priority to an oldest branch instruction in the BRQ after a threshold of low confidence conditional branch instructions have been selected for execution.

11. A method for selection and execution of conditional branch instructions, the method comprising:
fetching instructions from instruction cache, and scanning the fetched instructions for conditional branch instructions;
obtaining a branch confidence level assignment for each fetch conditional branch instruction;
dispatching the conditional branch instructions with the obtained confidence level to a branch issue queue (BRQ);
prioritizing the conditional branch instructions in the BRQ based on the assigned confidence level and age, including selection of one of the conditional branch instructions ready for execution;
executing the selected conditional branch instruction; and
dynamically updating the confidence level of a non-executed younger branch instruction populated in the BRQ, the update reflecting prediction confidence.

12. The method of claim 11, further comprising:
identifying a younger branch instruction in the BRQ having a same execution path as the executed branch instruction; and
updating the branch confidence level of the younger branch instruction from a low confidence level to a high confidence level after successful resolution of the executed branch instruction.

13. The method of claim 11, further comprising:

identifying a younger branch instruction in the BRQ having a same execution path as the executed branch instruction; and maintaining the branch confidence level of the younger branch instruction in the BRQ at a high confidence level following successful resolution of the executed branch instruction.

14. The method of claim 11, further comprising:

flushing out a younger branch instruction from the BRQ after an unsuccessful resolution of the executed branch instruction.

15. The method of claim 11, further comprising:

tracking selection of a low confidence level branch instruction, including re-assigning a priority to an oldest branch instruction in the BRQ after a threshold of low confidence conditional branch instructions have been selected for execution.

* * * * *